US010324245B2

United States Patent
Kim et al.

(10) Patent No.: US 10,324,245 B2
(45) Date of Patent: Jun. 18, 2019

(54) BACKLIGHT UNIT FOR HOLOGRAPHIC DISPLAY

(71) Applicant: SAMSUNG ELECTRONICS CO., LTD., Suwon-si (KR)

(72) Inventors: Sunil Kim, Seoul (KR); Alexander V. Morozov, Moscow area (RU); Andrey N. Putilin, Moscow (RU); Sergey E. Dubynin, Moscow (RU); German B. Dubinin, Moscow area (RU); Sergey S. Kopenkin, Moscow (RU); Yuriy P. Borodin, Moscow (RU); Hongseok Lee, Seongnam-si (KR); Chilsung Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 608 days.

(21) Appl. No.: 14/809,581

(22) Filed: Jul. 27, 2015

(65) Prior Publication Data

US 2016/0033710 A1    Feb. 4, 2016

(30) Foreign Application Priority Data

Jul. 29, 2014  (RU) ................................ 2014131445
Feb. 12, 2015  (KR) ........................ 10-2015-0021776

(51) Int. Cl.
*F21V 8/00* (2006.01)
*G03H 1/22* (2006.01)
*G03H 1/04* (2006.01)

(52) U.S. Cl.
CPC ......... *G02B 6/0023* (2013.01); *G02B 6/0065* (2013.01); *G02B 6/0073* (2013.01);
(Continued)

(58) Field of Classification Search
CPC .. G02B 6/0023; G02B 6/0065; G02B 6/0073; G03H 1/2286; G03H 1/2294;
(Continued)

(56) References Cited

U.S. PATENT DOCUMENTS 5,465,311 A    11/1995  Caulfield et al.
5,854,697 A    12/1998  Caulfield et al.
(Continued)

FOREIGN PATENT DOCUMENTS

EP    1 726 986 B1    7/2010
JP    2003-195213 A    7/2003
(Continued)

*Primary Examiner* — Bao Q Truong
(74) *Attorney, Agent, or Firm* — Sughrue Mion, PLLC

(57) ABSTRACT

A backlight unit for a holographic display is provided. The backlight unit includes: at least one light source; at least one input coupler; a light guide panel (LGP) that guides light; a first holographic element on a first surface of the LGP; and a second holographic element on a second surface of the LGP, wherein the at least one input coupler is configured to uniformly transmit rays emitted from the at least one light source toward the first holographic element through the LGP, and the LGP is configured to transmit the rays incident from the at least one input coupler toward the first holographic element, and the first holographic element redirects the rays toward the second holographic element, the redirected rays being substantially parallel to one another, and the second holographic element emits rays incident from the first holographic element toward an outside of the LGP.

19 Claims, 6 Drawing Sheets

(52) U.S. Cl.
CPC ......... *G03H 1/2286* (2013.01); *G03H 1/2294* (2013.01); *G03H 2001/0439* (2013.01); *G03H 2001/0473* (2013.01)

(58) Field of Classification Search
CPC .... G03H 2001/0439; G03H 2001/0473; G02F 1/133602; G02F 1/133615; F21V 5/003; F21V 14/02; F21V 2200/00; F21V 2200/20
USPC .......................................................... 362/602
See application file for complete search history.

(56) References Cited

U.S. PATENT DOCUMENTS

| | | | |
|---|---|---|---|
| 6,429,913 | B2 | 8/2002 | Putilin |
| 6,799,849 | B2* | 10/2004 | Kim ................... G02B 27/0905 348/E9.027 |
| 7,542,669 | B2 | 6/2009 | Koishi |
| 7,573,623 | B2 | 8/2009 | Kim |
| 9,013,773 | B2 | 4/2015 | Bang et al. |
| 2002/0018158 | A1 | 2/2002 | Putilin |
| 2005/0105151 | A1 | 5/2005 | Kim |
| 2006/0132914 | A1* | 6/2006 | Weiss ................. G02B 27/0172 359/462 |
| 2009/0174919 | A1 | 7/2009 | Moss |
| 2011/0267666 | A1 | 11/2011 | Redmond |
| 2012/0188791 | A1 | 7/2012 | Voloschenko et al. |
| 2013/0170004 | A1 | 7/2013 | Futterer |
| 2013/0265625 | A1 | 10/2013 | Facke et al. |
| 2014/0036361 | A1* | 2/2014 | Woodgate ............. H04N 13/00 359/466 |

FOREIGN PATENT DOCUMENTS

| | | |
|---|---|---|
| JP | 3863477 B2 | 12/2006 |
| KR | 10-2013-0022900 A | 3/2013 |
| KR | 10-2014-0042264 A | 4/2014 |
| KR | 10-1495401 B1 | 2/2015 |

* cited by examiner

BACKLIGHT UNIT FOR HOLOGRAPHIC DISPLAY

CROSS-REFERENCE TO RELATED APPLICATIONS

This application claims priority from Russian Patent Application No. 2014131445, filed on Jul. 29, 2014, in the Russian Patent Office and Korean Patent Application No. 10-2015-0021776, filed on Feb. 12, 2015, in the Korean Intellectual Property Office, the disclosures of which are incorporated herein in their entirety by reference.

BACKGROUND

1. Field

Exemplary embodiments relate to backlight units for implementing three-dimensional (3D) holographic displays using a coherent parallel light from a laser light source.

2. Description of the Related Art

As many three-dimensional (3D) movies have emerged, research into technology relating to 3D image display apparatuses has been carried out. A 3D image display apparatus using a binocular parallax provides an image for a left eye and an image for a right eye having different viewpoints to a left eye and a right eye of a viewer, respectively, so that the viewer can experience a 3D effect. Examples of these 3D image display apparatuses include glasses type 3D image display apparatuses that require special glasses and non-glasses type 3D image display apparatuses that do not require glasses.

However, when the viewer sees a 3D image displayed in a binocular parallax manner, the user may experience a tremendous amount of eye fatigue. Further, the 3D image display apparatuses that provide only two viewpoints of the image for the left eye and the image for the right eye, do not reflect the changing viewpoints that occur due to the viewer's movement. Thus, the 3D image display apparatuses are limited in providing a natural 3D effect.

In order to display a more natural 3D image, research into holographic displays has been carried out.

SUMMARY

Provided are backlight units that may output a parallel light having high uniformity and may reduce a loss of light caused by reflection during light guiding.

Additional aspects will be set forth in part in the description which follows and, in part, will be apparent from the description, or may be learned by practice of the presented exemplary embodiments.

According to an aspect of an exemplary embodiment, a backlight unit includes: at least one light source; at least one input coupler; a light guide panel (LGP) that guides light; a first holographic element on a first surface of the LGP; and a second holographic element on a second surface of the LGP, wherein the at least one input coupler is configured to uniformly transmit rays emitted from the at least one light source toward the first holographic element through the LGP, and the LGP is configured to transmit the rays incident from the at least one input coupler toward the first holographic element without total reflection, and the first holographic element redirects the rays toward the second holographic element, wherein the redirected rays are in parallel to one another, and the second holographic element emits the redirected rays incident from the first holographic element toward an outside of the LGP.

The second holographic element may be disposed at a top side or bottom side of the LGP.

The at least one light source may include at least one of a light emitting diode, a laser diode, a solid laser generator, and an optical fiber.

The at least one input coupler may include at least one of a concave lens, a convex lens, a transmissive holographic element, and a reflective holographic element.

The LGP may include at least one of highly transmissive plastic, optical glass, and quartz glass.

The second holographic element may emit rays toward the outside of the LGP in parallel to one another.

The second holographic element may form at least two concentrated fields of view at a predetermined distance.

The LGP may have a constant cross-section along the entire length of the LGP.

A cross-section of the LGP may be rectangular shaped.

Each of the first holographic element and the second holographic element may include a diffraction lattice.

Each of the first holographic element and the second holographic element may be formed of an optically transparent material.

A front side, a bottom side, a top side, and a rear side of the LGP may be flat.

The backlight unit may further include an eye-tracker that tracks a pupil position of a user.

According to an aspect of another exemplary embodiment, a backlight unit is provided. The backlight unit includes: at least one light source configured to emit rays; at least one input coupler configured to receive the rays emitted from the at least one light source and uniformly transmit the received rays; a light guide panel (LGP) configured to receive the rays incident from the at least one input coupler and transmit the received rays incident from the at least one input coupler; a first holographic element configured to redirect the rays transmitted by the LGP; and a second holographic element configured to receive the redirected rays incident from the first holographic element and emit the received redirected rays incident from the first holographic element toward an outside of the LGP.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION OF EXEMPLARY EMBODIMENTS

Figure 1:
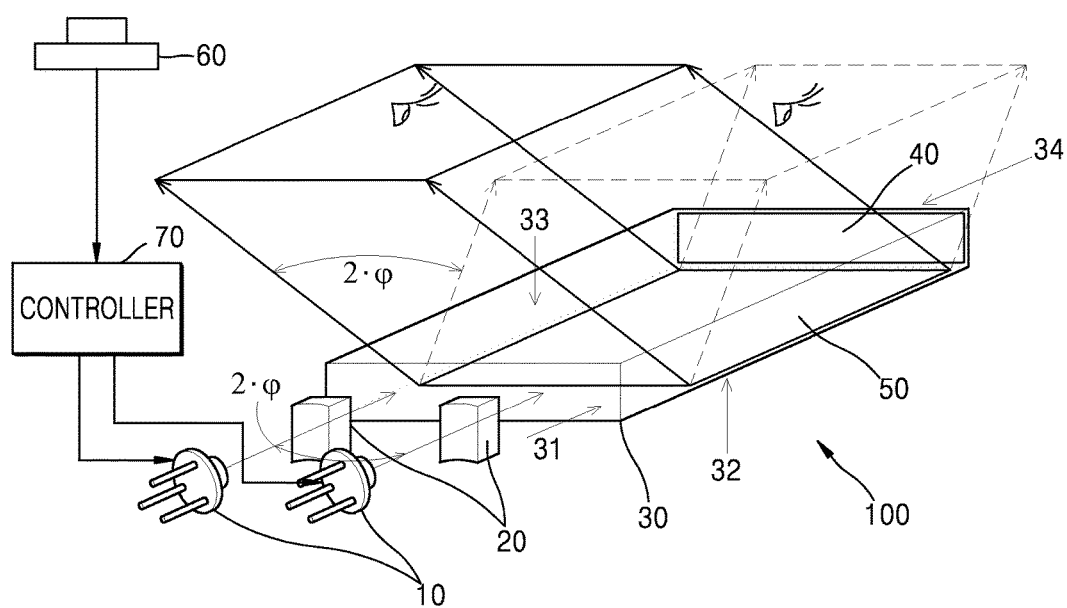
FIG. 1 is a schematic view of a configuration of a backlight unit that emits a parallel light, according to an exemplary embodiment.

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects. In the drawings, in order to more clearly describe the inventive concept, irrelevant portions to the description are omitted, and like reference numerals are used for like elements throughout the specification.

It will be understood that when a component is referred to as being "connected to," another component, it can be "directly connected to" the other component or "electrically connected to" the other component in a state in which intervening components are present. It will be understood that when a component "comprises" another component, it does not exclude other components but further comprises another component unless otherwise indicated herein. Expressions such as "at least one of," when preceding a list of elements, modify the entire list of elements and do not modify the individual elements of the list.

Figure 2:
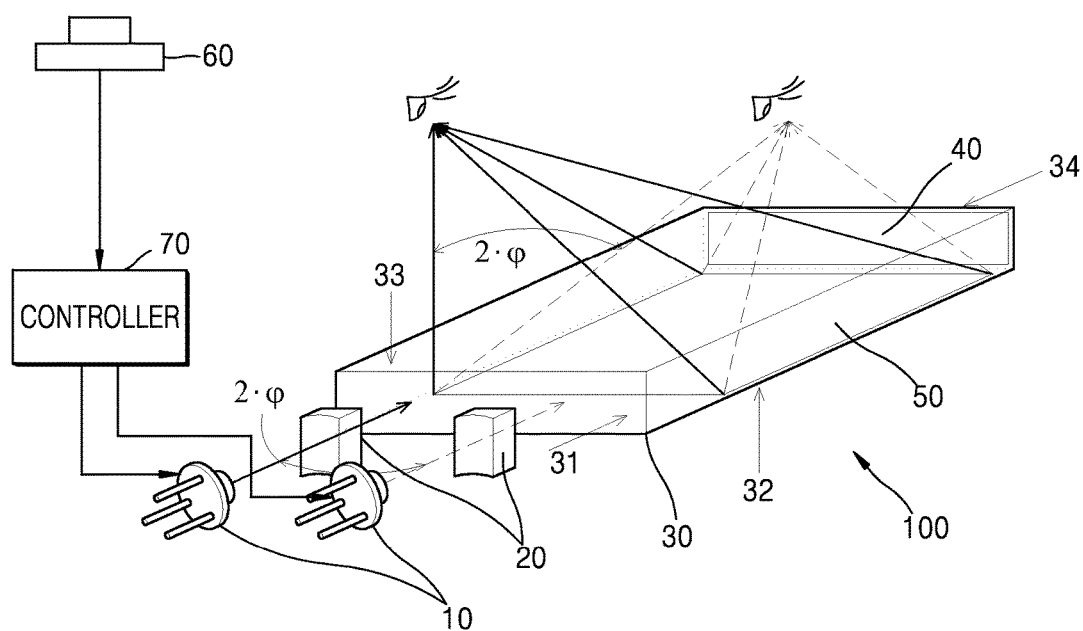
FIG. 2 is a schematic view of a configuration of the backlight unit that forms two concentrated fields of view at a predetermined distance, illustrated in FIG. 1.

FIG. 1 is a schematic view of a configuration of a backlight unit 100 that emits a parallel light, according to an exemplary embodiment, and FIG. 2 is a schematic view of a configuration of the backlight unit 100 that forms two concentrated fields of view at a predetermined distance, illustrated in FIG. 1.

Referring to FIG. 1, the backlight unit 100 may include two light source units 10, two input couplers 20, a light guide panel (LGP) 30, a first holographic element 40, and a second holographic element 50.

The LGP 30 may include a front side 31, a bottom side 32, a top side 33, and a rear side 34.

The first holographic element 40 may be placed at the rear side 34 of the LGP 30, and the second holographic element 50 may be placed at the bottom side 32 of the LGP 30.

Each of the light source units 10 may emit light toward each of the input couplers 20. Each light source unit 10 may include a light emitting diode (LED), a laser diode, a solid laser, or an optical fiber. However, the light source unit 10 is not limited thereto but may include any type of a light source suitable for the backlight unit 100.

Each input coupler 20 may provide uniform light to the first holographic element 40 using light emitted from the light source unit 10. Each input coupler 20 may include a concave lens, a convex lens, a transmission type holographic element, a reflection type holographic element, or a combination thereof, and is not limited thereto.

In FIG. 1, two light source units 10 and two input couplers 20 are illustrated. However, exemplary embodiments are not limited thereto, and a different number of input couplers 20 may be provided.

The LGP 30 may transmit the light incident from the light source unit 10 to the first holographic element 40 from the inside of the LGP 30 without total reflection. That is, the light incident in the inside of the LGP 30 may be transmitted to the first holographic element 40 without being totally reflected from the front side 31, the bottom side 32, and the top side 33 of the LGP 30. The LGP 30 may have any shape suitable for transmitting the incident light. For example, as illustrated in FIG. 1, a cross-section of the LGP 30 may have a rectangular shape or a square shape. However, the shape of the cross-section of the LGP 30 is not limited thereto. The LGP 30 may be formed so that the cross-section of the LGP 30 may be uniform along the entire length of the LGP 30. The LGP 30 may be formed of high-transmission plastics, optical glass, or quartz glass. However, the shape of the cross-section of the LGP 30 and a material used for forming the same are not limited thereto, and the LGP 30 may be formed to have other shapes using other materials.

The first holographic element 40 may redirect rays incident from the light source unit 10 toward the second holographic element 50 placed at the bottom surface 32 of the LGP 30, wherein the redirected rays are in parallel to one another.

The second holographic element 50 may reflect the rays redirected by the first holographic element 40. The rays reflected by the second holographic element 50 may be emitted from the LGP 30 through the top side 33 of the LGP 30.

Each of the first holographic element 40 and the second holographic element 50 may include a diffraction lattice. A distance between diffraction lattices and an inclined angle thereof may be properly adjusted so that the first holographic element 40 may redirect the rays incident from the light source unit 10 toward the second holographic element 50 placed at the bottom side 32 of the LGP 30. The redirected rays may be parallel to one another or substantially parallel to one another. The distance between the diffraction lattices and the inclined angle thereof may be properly adjusted so that the second holographic element 50 may reflect the rays redirected by the first holographic element 40 and may emit the rays from the LGP 30 through the top side 33 of the LGP 30.

An angle formed between the rear side 34 of the LGP 30 at which the first holographic element 40 is placed, and the bottom side 32 of the LGP 30 at which the second holographic element 50 is placed, does not need to be 90° and may be diverse. In this case, the distance between the diffraction lattices and the inclined angle thereof may be properly adjusted so that the rays incident on may be redirected toward the second holographic element 50, wherein the redirected rays are in parallel to one another. The distance between the diffraction lattices and the inclined angle thereof may be properly adjusted so that the second holographic element 50 may reflect the rays redirected by the first holographic element 40 and the reflected rays may be emitted from the LGP 30 through the top side 33 of the LGP 30.

The second holographic element 50 may have two or more configurations.

Referring to FIG. 1, which illustrates a first configuration, the second holographic element 50 may emit the rays incident from the first holographic element 40 as at least two parallel rays through the top side 33 of the LGP 30.

Referring to FIG. 2, which illustrates a second configuration, the second holographic element 50 may operate as an objective lens and may emit the rays incident from the first holographic element 40 so as to form at least two concentrated fields of view at a predetermined distance from the LGP 30.

The rays emitted in parallel or rays directed toward one point according to the exemplary embodiment of the second holographic element 50 may be emitted toward a holographic display.

The backlight unit 100 according to the present exemplary embodiment may have at least two optical channels. In particular, the backlight unit 100 may form a left field of view and a right field of view. Each of the left field of view and the right field of view may be formed from the light source unit 10, one input coupler 20, the LGP 30, the first holographic element 40, and the second holographic element 50. An angle 2φ between two optical channels may be determined by an angle between two rays emitted from the light source unit 10 and incident on the first holographic element 40. The average distance between a user's eyes is generally approximately 62 mm, and at least two light source units 10 may be placed so that the angle 2φ between two optical channels may be achieved based on the average distance. However, the distance between a user's eyes may be slightly different for each user. Thus when there is movement in the user's viewpoint, a hologram image formed based on the average distance may appear slightly unnatural to a user whose eyes are spaced apart by a distance different from the average.

In order to solve the problem, the backlight unit 100 may further include an eye-tracker 60 and a controller 70. The eye-tracker 60 is used to detect the user's eye position. To this end, the eye-tracker 60 may include an infrared camera, a visible ray camera, or other various sensors. The eye-tracker 60 may acquire the user's image from a camera, for example, may detect the user's pupil from the user's image, and may analyze the user's pupil position. When an observer's eye is not found due to blinking of the eye or an obstacle, the position of the eye may be estimated, and the movement of the eye position may be predicted according to the user's movement. The eye-tracker 60 may track a change in the user's pupil position in real time and may provide the result of tracking to the controller 70. When the user's pupil position changes according to information detected by the eye-tracker 60, the controller 70 may control a light output direction of the backlight unit 100 by moving the light source unit 10 so that a generation position of the image may be adjusted to the changes in the user's pupil position light output.

Figure 3:
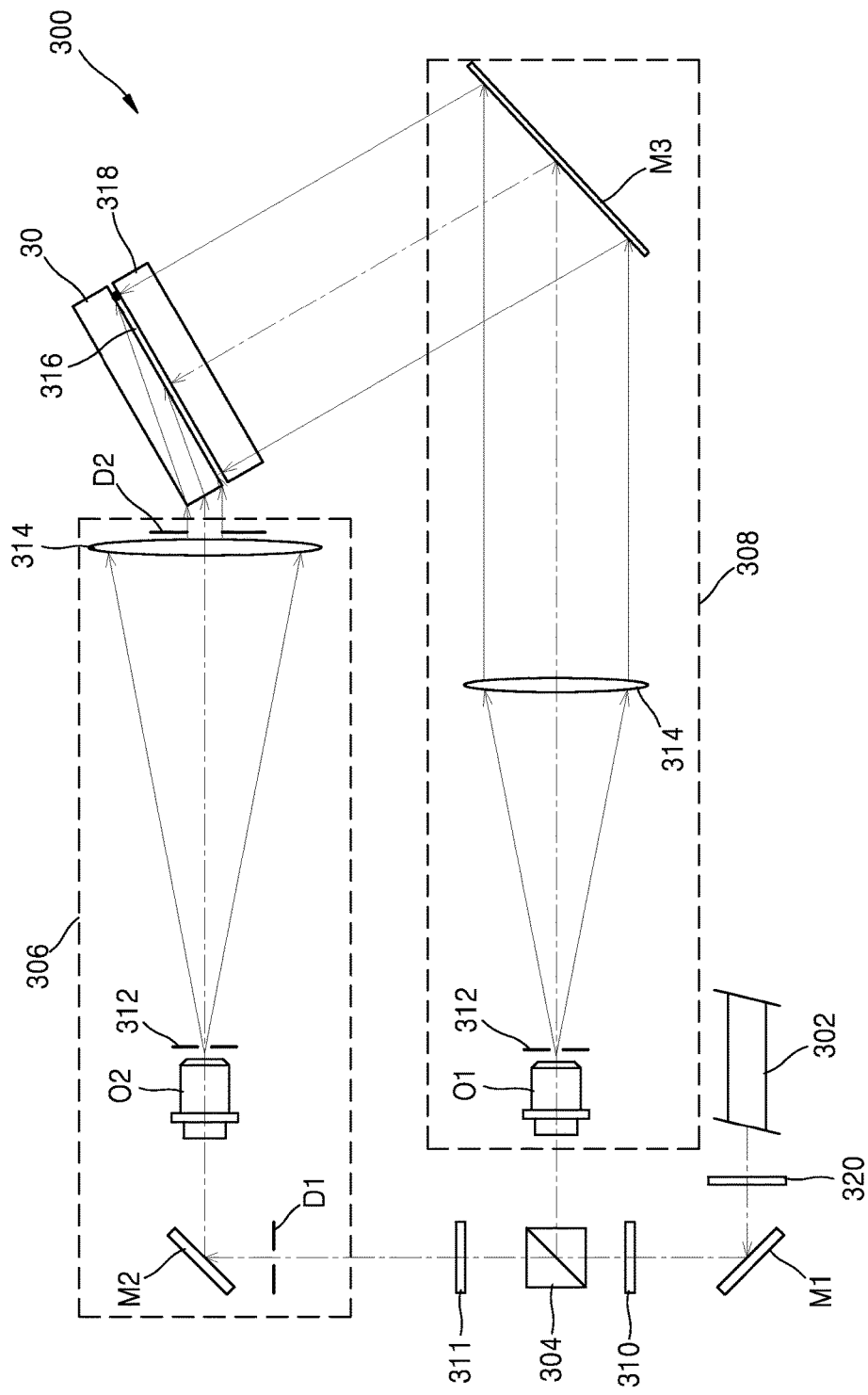
FIG. 3 is a schematic view of a hologram recording apparatus for recording a hologram provided by a second holographic element that emits a parallel light onto a top surface of a light guide panel (LGP), according to an exemplary embodiment.

FIG. 3 is a schematic view of a configuration of a hologram recording apparatus 300 for recording diffraction patterns in the second holographic element 50 that emits parallel light onto the top side 33 of the LGP 30. Referring to FIG. 3, the hologram recording apparatus 300 may include a light source unit 302, a shutter 320, reflection members M1, M2, and M3, a first half-wavelength plate 310, a second half-wavelength plate 311, a polarized beam splitter 304, diaphragms D1 and D2, a pin hole 312, microlenses O1 and O2, a lens 314, a LGP 30, a photosensitive medium 316, and a cover glass 318.

The rays incident from light sources of the light source unit 302 may be split into a reference beam that passes through a reference portion 306 and a signal beam that passes through a signal portion 308 using the polarized beam splitter 304.

Intensities of the reference beam and the signal beam may be adjusted by the first half-wavelength plate 310. By rotating the first half-wavelength plate 310, intensities of the reference beam and the signal beam may be adjusted.

The reference beam and the signal beam split by the polarized beam splitter 304 may have different polarized states. For example, the reference beam may be in a P-polarized (or S-polarized) state, and the signal beam may be in an S-polarized (or P-polarized) state. Since the reference beam and the signal beam need to have the same polarized state for hologram recording, the second half-wavelength plate 311 may be added so as to change one polarized state of the reference beam and the signal beam. In FIG. 3, the second half-wavelength plate 311 may be added so as to change the polarized state of the reference beam. However, the second half-wavelength plate 311 may also be added so as to change the polarized state of the signal beam.

The reference beam at the reference portion 306 is filtered by the pin hole 312 and is made parallel by the lens 314. The parallel reference beam may transmit sides of the LGP 30 and may proceed in a direction of the photosensitive medium 316. The photosensitive medium 316 may contact the bottom side 32 of the LGP 30.

The signal beam at the signal portion 308 is filtered by the pin hole 312 and is made parallel by the lens 314. The parallel signal beam may be reflected by the reflection member M3 and may proceed in the direction of the photosensitive medium 316.

A loss of the signal beam caused by reflection may occur in the bottom side 32 of the LGP 30 at which the photosensitive medium 316 is placed. In order to reduce the loss of the signal beam caused by reflection, the cover glass 318 may contact the photosensitive medium 316.

The shutter 320 may adjust an exposure time of the rays incident from the light source unit 302.

Figure 4:
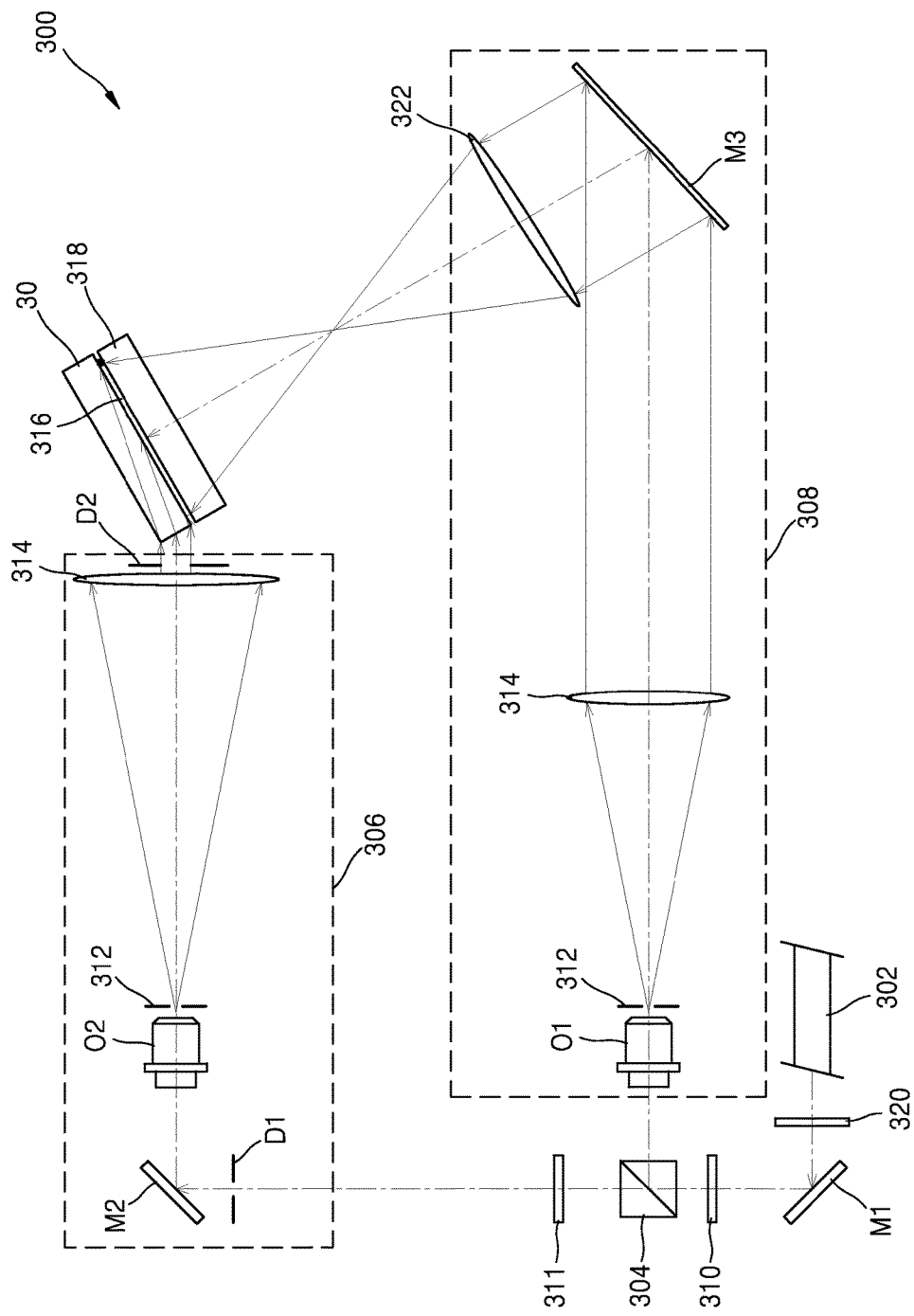
FIG. 4 is a schematic view of a hologram recording apparatus for recording a hologram provided by a second holographic element that forms concentrated fields of view at a predetermined distance, according to another exemplary embodiment.

FIG. 4 is a schematic view of a hologram recording apparatus 400 for recording a hologram provided by the second holographic element 50 that forms concentrated fields of view at a predetermined distance, according to another exemplary embodiment. Referring to FIG. 4, the hologram recording apparatus 300 illustrated in FIG. 3 may further include an objective lens 322 placed at the signal portion 308. The objective lens 322 may focus light and may form concentrated fields of view at a predetermined distance when the hologram recording apparatus 400 is reproduced.

Figure 5:
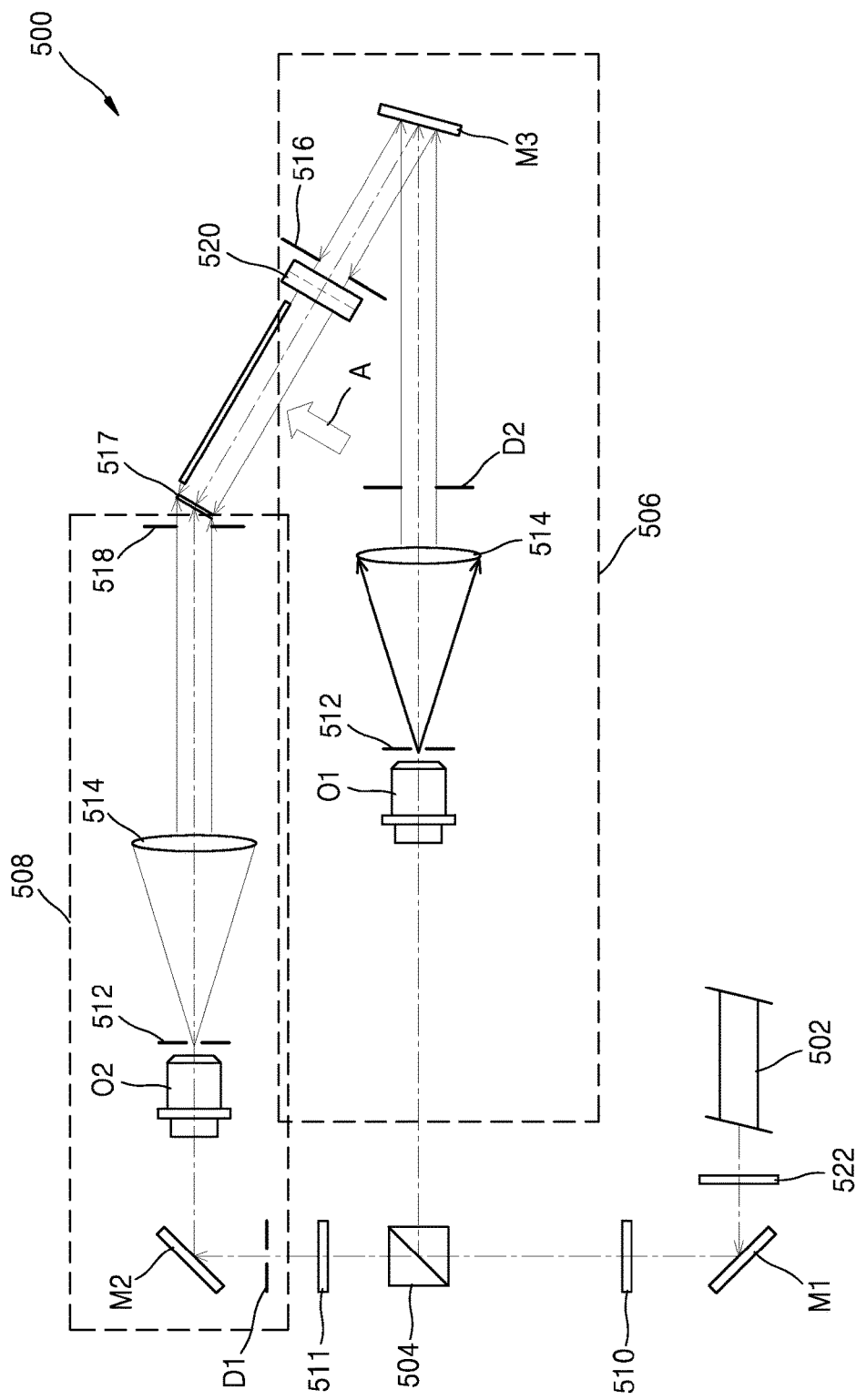
FIG. 5 is a schematic view of a configuration of a hologram recording apparatus for recording a hologram provided by a first holographic element that redirects incident rays of light toward a second holographic element, wherein the redirected rays of light are in parallel to one another, according to another exemplary embodiment.
Figure 6:
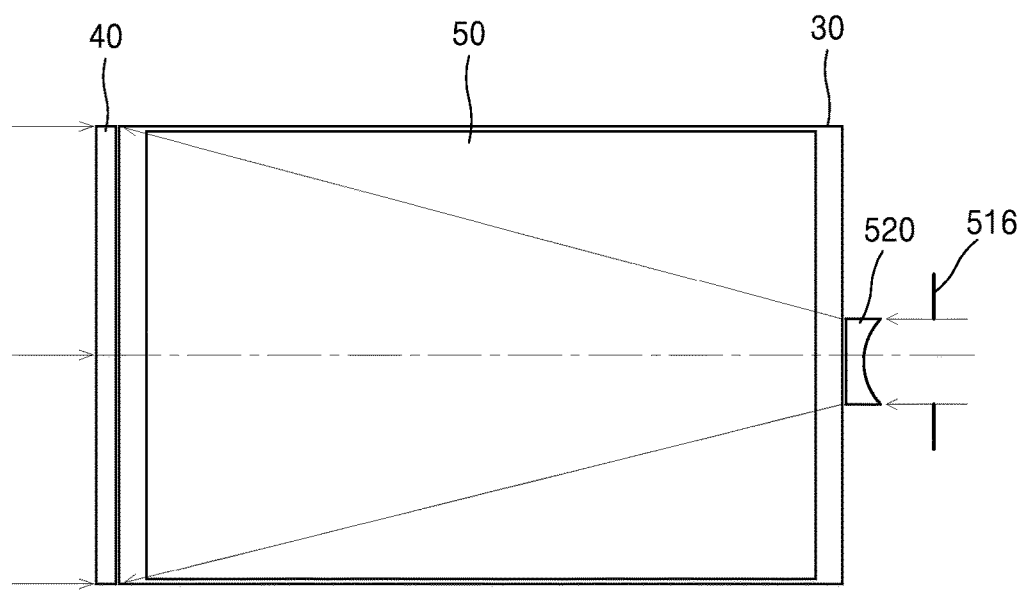
FIG. 6 is a cross-sectional view of the hologram recording apparatus illustrated in FIG. 5, viewed from a direction of arrow A.

FIG. 5 is a schematic view of a configuration of a hologram recording apparatus 500 for recording a hologram provided by the first holographic element 40 that redirects incident rays of light toward the second holographic element 50. The redirected rays of light are parallel to one another or substantially parallel to one another. According to another exemplary embodiment, FIG. 6 is a cross-sectional view of the hologram recording apparatus illustrated in FIG. 5, viewed from a direction of arrow A.

Referring to FIG. 5, the hologram recording apparatus 500 may include a light source unit 502, a shutter 522, reflection members M1, M2, and M3, a first half-wavelength plate 510, a second half-wavelength plate 511, a polarized beam splitter 504, diaphragms D1 and D2, a pin hole 512, micro-lenses O1 and O2, a lens 514, a light guide panel (LGP) 30, a rectangular aperture surface 516, a photosensitive medium 517, a slit 518, and a cylinder type concave lens 520.

The rays incident from light sources of the light source unit 502 may be split into a reference beam that passes through a reference portion 506 and a signal beam that passes through a signal portion 508, respectively, using the polarized beam splitter 504.

The polarized state of the rays may be adjusted by the first half-wavelength plate 510. By rotating the first half-wavelength plate 510, intensities of the reference beam and the signal beam may be adjusted.

The reference beam and the signal beam split by the polarized beam splitter 504 may have different polarized states. For example, the reference beam may be in a P-polarized (or S-polarized) state, and the signal beam may be in an S-polarized (or P-polarized) state. Since the reference beam and the signal beam need to have the same polarized state for hologram recording, the second half-wavelength plate 511 may be added so as to change one polarized state of the reference beam and the signal beam. In FIG. 5, the second half-wavelength plate 511 is added so as to change the polarized state of the reference beam. However, the second half-wavelength plate 511 may also be added so as to change the polarized state of the signal beam.

The signal beam at the signal portion 508 may be filtered by the pin hole 512 and may be made parallel by the lens 514. The parallel signal beam may be absorbed into the slit 518 placed at the signal portion 508 and may proceed in a direction of the photosensitive medium 517.

The reference beam at the reference portion 506 may be filtered by the pin hole 512 and may be made parallel by the lens 514. The parallel signal beam may be reflected by the reflection member M3, may be absorbed onto the rectangular aperture surface 516, and may proceed in the direction of the photosensitive medium 517. The photosensitive medium 517 may contact the rear side 34 of the LGP 30.

When the reference beam at the reference portion 506 is incident into the LGP 30, the cylinder type concave lens 520 may be used to uniformly spread rays into the LGP 30. Referring to FIG. 6, the signal beam may be uniformly spread into the LGP 30 using the cylinder type concave lens 502.

The shutter 522 may adjust an exposure time of the rays incident from light sources of the light source unit 502.

The light source unit 502 may include at least two laser diodes. However, the usage of several laser diodes may cause overheating of the backlight unit 100. In order to minimize overheating of the backlight unit 100, an optical material having a very low absorption rate may be used. The optical material may be high-transmission plastics, optical glass, or quartz glass, but is not limited thereto.

The first holographic element 40 placed at the rear side 34 of the LGP 30 and the second holographic element 50 placed at the bottom side 32 of the LGP 30 may be recorded independently from each other. Thus, parameters of each of the holographic elements 40 and 50 may be adjusted so that output parameters of the entire system may be adjusted.

The backlight unit 100 may be applied to a holographic display, a smartphone, or a 3D TV.

As described above, according to the one or more of the above exemplary embodiments, a backlight unit according to the exemplary embodiment may make a coherent parallel light.

In addition, the backlight unit according to the exemplary embodiment may form at least two fields of view.

In addition, the backlight unit according to the exemplary embodiment may improve efficiency and uniformity of illumination.

Furthermore, the backlight unit according to the exemplary embodiment may reduce the thickness of the backlight unit.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A backlight unit comprising:
   at least two light sources;
   at least two input couplers;
   a light guide panel (LGP) that guides light;
   a first holographic element on a first surface of the LGP;
   a second holographic element on a second surface of the LGP; and
   a controller that controls light output directions of the at least two light sources by moving the at least two light sources,
   wherein the at least two input couplers are configured to uniformly transmit rays emitted from the at least two light sources toward the first holographic element through the LGP, and
   the LGP is configured to transmit the rays incident from the at least two input couplers toward the first holographic element, and
   the first holographic element redirects the rays toward the second holographic element, the redirected rays being substantially parallel to one another,
   the second holographic element emits the redirected rays incident from the first holographic element toward an outside of the LGP to form two different fields of view, and
   an angle between the two fields of view is determined by an angle between two rays emitted from the at least two light sources.

2. The backlight unit of claim 1, wherein the second holographic element is disposed at a top side or bottom side of the LGP.

3. The backlight unit of claim 1, wherein the at least two light sources comprise at least one from among a light emitting diode, a laser diode, a solid laser generator, and an optical fiber.

4. The backlight unit of claim 1, wherein the at least two input couplers comprise at least one from among a concave lens, a convex lens, a transmissive holographic element, and a reflective holographic element.

5. The backlight unit of claim 1, wherein the LGP comprises at least one from among highly transmissive plastic, optical glass, and quartz glass.

6. The backlight unit of claim 1, wherein the second holographic element emits rays toward the outside of the LGP in parallel to one another.

7. The backlight unit of claim 1, wherein the second holographic element forms at least two concentrated fields of view at a predetermined distance.

8. The backlight unit of claim 1, wherein a cross-section of the LGP is constant along the entire length of the LGP.

9. The backlight unit of claim 8, wherein the cross-section of the LGP is rectangular shaped.

10. The backlight unit of claim 1, wherein each of the first holographic element and the second holographic element comprises a diffraction lattice.

11. The backlight unit of claim 1, wherein each of the first holographic element and the second holographic element is formed of an optically transparent material.

12. The backlight unit of claim 1, wherein a front side, a bottom side, a top side, and a rear side of the LGP are flat.

13. The backlight unit of claim 1, further comprising an eye-tracker configured to track a pupil position of a user.

14. A backlight unit comprising:
   at least two light sources configured to emit rays;

at least two input couplers configured to receive the rays emitted from the at least two light sources and uniformly transmit the received rays;

a light guide panel (LGP) configured to receive the rays incident from the at least two input couplers and transmit the received rays incident from the at least two input couplers;

a first holographic element configured to redirect the rays transmitted by the LGP;

a second holographic element configured to receive the redirected rays incident from the first holographic element and emit the received redirected rays incident from the first holographic element toward an outside of the LGP to form two different fields of view; and a controller that controls light output directions of the at least two light sources by moving the at least two light sources, wherein an angle between the two different fields of view is determined by an angle between two rays emitted from the at least two light sources.

15. The backlight unit of claim 14, wherein the second holographic element is disposed at a top side or bottom side of the LGP.

16. The backlight unit of claim 14, wherein the at least two light sources comprise at least one from among a light emitting diode, a laser diode, a solid laser generator, and an optical fiber.

17. The backlight unit of claim 14, wherein the at least two input couplers comprise at least one from among a concave lens, a convex lens, a transmissive holographic element, and a reflective holographic element.

18. The backlight unit of claim 14, wherein the LGP comprises at least one from among highly transmissive plastic, optical glass, and quartz glass.

19. The backlight unit of claim 14, wherein the received redirected rays incident from the first holographic element and emitted by the second holographic element toward the outside of the LGP are substantially parallel to each other.

* * * * *